United States Patent
Blandy et al.

(10) Patent No.: US 6,256,752 B1
(45) Date of Patent: Jul. 3, 2001

(54) METHOD AND APPARATUS FOR DYNAMIC SWAPPABLE BYTECODE LOOP IN JAVA VIRTUAL MACHINES

(75) Inventors: Geoffrey Owen Blandy; Tatchi Placido Lay, both of Austin; Gareth Christopher Matthews, Cedar Park, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/121,699

(22) Filed: Jul. 24, 1998

(51) Int. Cl.⁷ ....................................... G06F 11/00
(52) U.S. Cl. .................................. 714/38; 717/4
(58) Field of Search ............................ 714/35, 38; 717/4

(56) References Cited

U.S. PATENT DOCUMENTS 6,021,273 * 2/2000 Griesemer ................................ 717/5

* cited by examiner

*Primary Examiner*—Robert Beausoleil
*Assistant Examiner*—Bryce P. Bonzo
(74) *Attorney, Agent, or Firm*—Duke W. Yee; David A. Mims

(57) ABSTRACT

A method and apparatus for executing and debugging programs in a data processing system. The data processing system includes a first dispatch table, wherein the dispatch table is located at a dispatch table address and wherein the dispatch table includes addresses to routines executed for bytecodes. A second dispatch table is provided in which the second dispatch table includes addresses to routines for analyzing a program and addresses to the routines executed for bytecodes. The data processing system includes an interpreter, wherein the interpreter accesses a dispatch table located at the dispatch table address to process bytecodes. The first dispatch table is saved in response to a request to analyze a program. The second dispatch table is copied to the dispatch table address in response to saving of the dispatch table.

19 Claims, 4 Drawing Sheets

METHOD AND APPARATUS FOR DYNAMIC SWAPPABLE BYTECODE LOOP IN JAVA VIRTUAL MACHINES

BACKGROUND OF THE INVENTION

1. Technical Field

The present invention relates generally to an improved data processing system and in particular to an improved method and apparatus for executing programs in a data processing system. Still more particularly, the present invention provides an improved method and apparatus for debugging programs in a data processing system.

2. Description of Related Art

A computer includes both a physical machine, namely the hardware, and the instructions which cause the physical machine to operate, namely the software. Software includes both application and operating system programs. If the program is simply to do tasks for a user, such as solving specific problems, it is referred to as application software. If a program controls the hardware of the computer and the execution of the application programs, it is called operating system software. System software further includes the operating system, the program that controls the actual computer or central processing unit (CPU), and device drivers that control the input and output devices (I/O) such as printers and terminals.

A number of application programs are usually present waiting to use the CPU. The operating system determines which program will run next, how much of the CPU time it will be allowed to use, and what other computer resources the application will be allowed to access and use. Further, each application program will require a special input or output device and the application program must transfer its data to the operating system, which controls the device drivers.

A network containing a number of computers may be formed by having these computers, also referred to as "nodes" or "network computers", communicate with each other over one or more communications links, which is an aggregation which is a computer network. Today, many computer workstations are connected to other workstations, file servers, or other resources in a network. Each computer on a network is connected to the network via an adapter card or other similar means, which provides an ability to establish a communications link to the network.

Applications are often sent to a computer from the server. Java applications are becoming increasingly more prevalent as the type of application sent between server and client computers. Java applications are common on the Internet and becoming more increasingly common in intranets and in other types of networks used in businesses.

Java is an object oriented programming language and environment focusing on defining data as objects and the methods that may be applied to those objects. Java supports only a single inheritance, meaning that each class can inherit from only one other class at any given time. Java also allows for the creation of totally abstract classes known as interfaces, which allow the defining of methods that may be shared with several classes without regard for how other classes are handling the methods.

The Java virtual machine (JVM) is a virtual computer component that resides only in memory. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system. The Java compiler generates bytecode instructions that are non-specific to a particular computer architecture. A bytecode is a machine independent code generated by the Java compiler and executed by a Java interpreter. A Java interpreter is a part in the JVM that alternately decodes and interprets a bytecode or bytecodes. These bytecode instructions are designed to be easy to interpret on any computer and easily translated on the fly into native machine code.

JVMs presently have two modes, also called "loops" used to execute bytecodes. One loop is called an assembly loop, which is a standard Java assembly loop, providing speed in executing bytecodes. The assembly loop in the JVM is written in native assembly language for the processor on which the JVM executes. Another loop is called a "C loop", which is typically used in debugging Java programs. This loop is normally written in C language or assembly and is designed to provide debugging functions. For example, a C loop allows for tracing and single stepping through the bytecodes in a Java program. A C loop, however, has a disadvantage of slower speed when compared to an assembly loop. A C loop may be ten times slower than an assembly loop. Thus, C loops are never used in enterprise or production environments.

Current Java operating systems (OSs) are unable to switch between these two loops dynamically. They are compile time options. As a result, users who execute a Java program using an assembly loop must restart the Java operating system (OS) to switch to a C loop to perform debugging of a Java program. The Java OS also must be restarted to execute a Java program when debugging is completed in order to take advantage of the speed provided by the assembly loop in the JVM. Therefore, it would be advantageous to provide an improved method and apparatus for providing debugging functions found in the C loop for debugging while providing the speed that is afforded by the assembly loop without having to restart the Java OS.

SUMMARY OF THE INVENTION

The present invention provides a method and apparatus for executing and debugging programs in a data processing system. The data processing system includes a first dispatch table, wherein the dispatch table is located at a dispatch table address and wherein the dispatch table includes addresses to routines executed for bytecodes. A second dispatch table is provided in which the second dispatch table includes addresses to instructions for analyzing a program and addresses to the routines executed for bytecodes. The data processing system includes an interpreter, wherein the interpreter accesses a dispatch table located at the dispatch table address to process bytecodes. The first dispatch table is saved in response to a request to analyze a program. The second dispatch table is copied to the dispatch table address in response to saving of the dispatch table.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
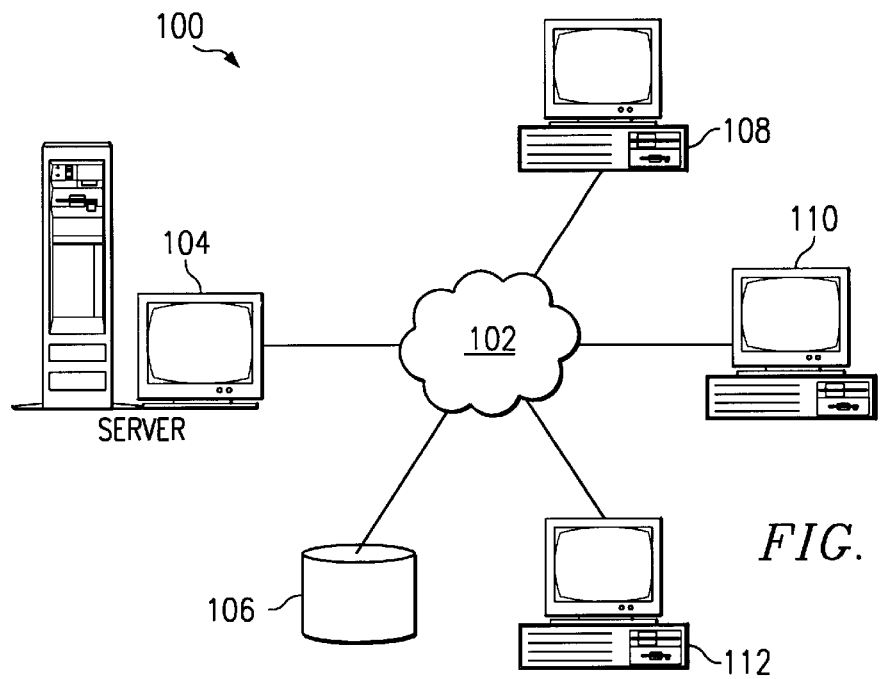
FIG. 1 is a diagram of a distributed data processing system in accordance with a preferred embodiment of the present invention.

With reference now to the figures, and in particular with reference to FIG. 1, a diagram of a distributed data processing system is depicted in accordance with a preferred embodiment of the present invention. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections. Distributed data processing system 100 may be for example, the Internet, a local area network, or a wide area network.

In the depicted example, a server 104 is connected to network 102 along with storage unit 106. In addition, client 108, 110, and 112 also are connected to network 102. These clients may be, for example, without limitation, personal computers or network computers. A network computer is any computer, coupled to a network, which receives a boot image from another computer coupled to the network and also may be a server managed computer. Server 104 provides data, and may be form example, a web server on the Internet, and applications to computers 108–112. Clients 108, 110, and 112 are clients to server 104. Distributed data processing system 100 may include additional servers, clients, and other devices not shown. FIG. 1 is intended as an example, and not as an architectural limitation for the processes of the present invention.

Figure 2:
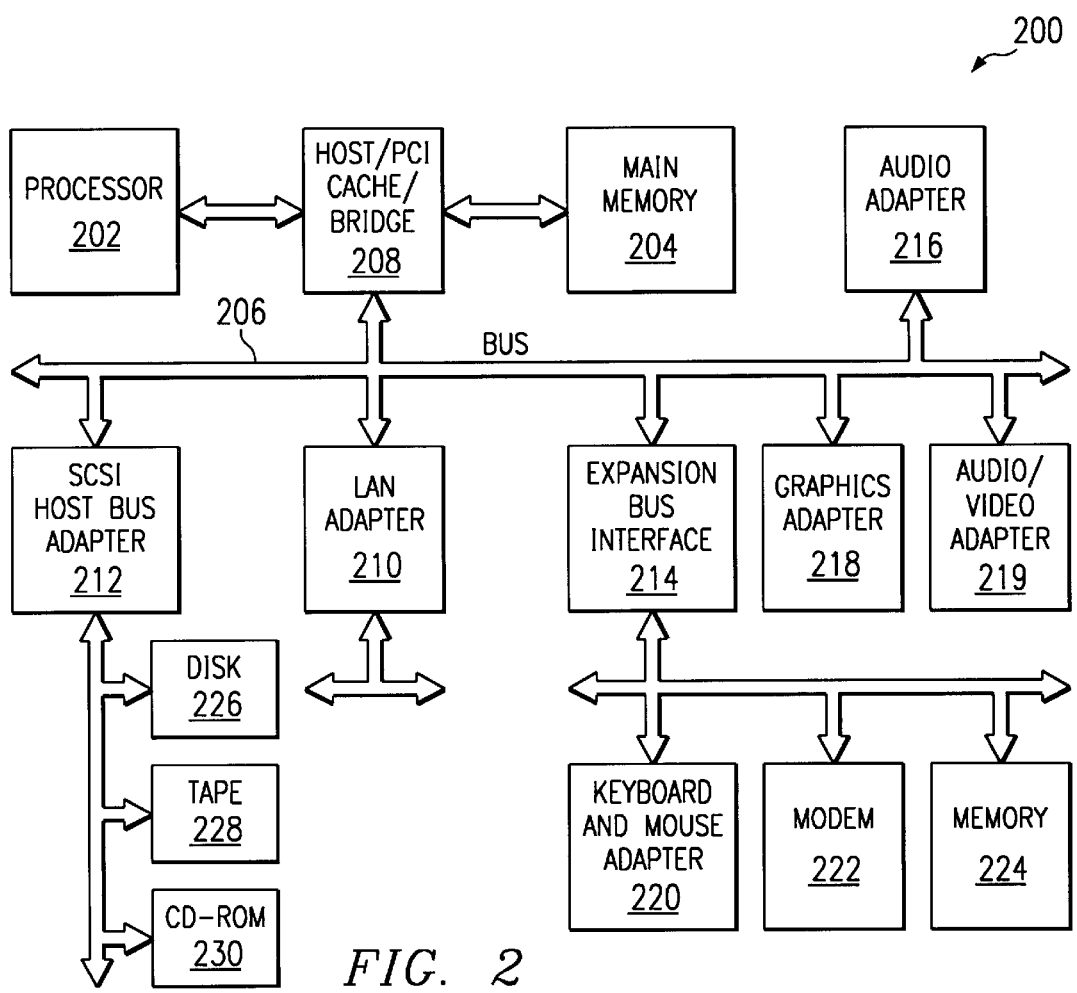
FIG. 2 is a block diagram of a data processing system in which the present invention may be implemented.

Turning next to FIG. 2, a block diagram of a data processing system 200 in which the present invention may be implemented is illustrated. Data processing system 200 may be used either as a server or a computer. Data processing system 200 employs a peripheral component interconnect (PCI) local bus architecture. Although the depicted example employs a PCI bus, other bus architectures such as Micro Channel and ISA may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter (A/V) 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM 230 in the depicted example. Typical PCI local bus implementations will support three or four PCI expansion slots or add-in connectors.

Those of ordinary skill in the art will appreciate that the hardware in FIG. 2 may vary depending on the implementation. For example, other peripheral devices, such as optical disk drives and the like may be used in addition to or in place of the hardware depicted in FIG. 2. Implemented as an NC, data processing system 200 may include fewer components than illustrated in FIG. 2. For example, many NCs may be diskless or have only a single storage device, such as hard disk drive 226. Data processing system 200 also may be implemented as a server. The depicted example is not meant to imply architectural limitations with respect to the present invention.

The present invention provides a method, data processing system, and instructions for providing speed in executing Java programs and serviceability by allowing debugging without having to restart or use a different Java OS image. The present invention provides a mechanism to switch dispatch tables in the assembly loop to provide debugging functions when analysis and debugging of a program is desired.

Figure 3:
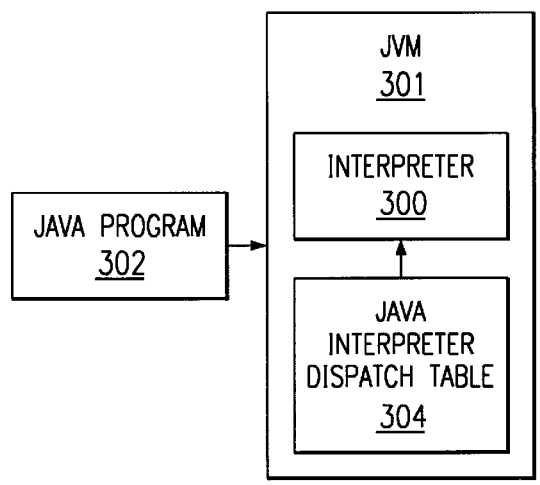
FIG. 3 is a diagram illustrating components used provide both speed in execution of bytecodes and debugging functions in accordance with a preferred embodiment of the present invention.

Turning to FIG. 3, a diagram illustrating components used provide both speed in execution of bytecodes and debugging functions is depicted in accordance with a preferred embodiment of the present invention. Interpreter 300 in Java Virtual Machine (JVM) 301 reads bytecodes from Java application 302. In executing the bytecodes from Java application 302, JVM 301 uses interpreter dispatch table 304, also referred to as a bytecode dispatch table, to branch to a routine that is to be executed for a bytecode that is to be executed for a bytecode. In accordance with a preferred embodiment of the present invention, the contents of interpreter dispatch table 304 may be replaced with an interpreter dispatch table that provides branching to instructions that allow for analysis and debugging of Java application 302 or tracing of the application. This mechanism provides for "swapping" of the bytecode dispatch table.

Figure 4:
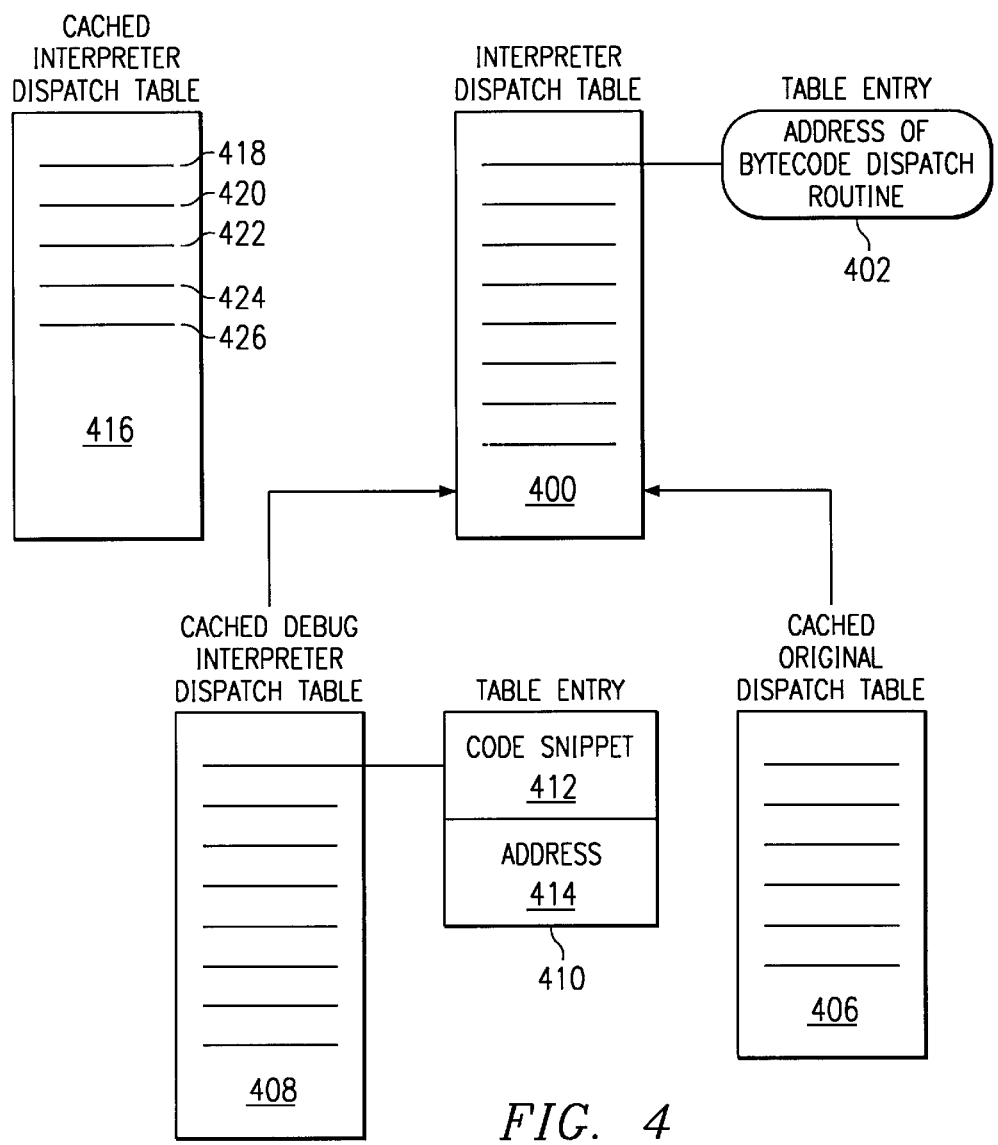
FIG. 4 is a diagram illustrating the processes used to provide swapping of the bytecode loop in accordance with a preferred embodiment of the present invention.

In FIG. 4, a diagram illustrating the processes used to provide swapping of the bytecode dispatch table is depicted in accordance with a preferred embodiment of the present invention. Interpreter dispatch table 400 includes a number of entries that provide for branching to instructions for the bytecode. This table is found in a memory location that is accessed by the interpreter when the interpreter is processing bytecodes. For example, entry 402 includes address 414.

Address 414 is the address of the bytecode dispatch routine that is to be executed for the bytecode being processed. The proper entry is determined by using the bytecode as an index to the entries. For example, table 400 may have 256 entries from 0 to 255 with each of the entries having an address to a routine, and the bytecode has a value from 0 to 255. In such a case the bytecode value is used to select the entry (i.e., a bytecode of 2 would index into entry number 2).

If servicing functions, such as debugging functions, are desired, interpreter dispatch table 400 is saved or cached as original dispatch table 406 into another area of memory or to some other storage device, such as, for example, a hard disk. Debug interpreter dispatch table 408 is copied into the memory location normally occupied by interpreter dispatch table 400. The interpreter in the JVM will now access debug interpreter dispatch table 408 when interpreting bytecodes.

Debug interpreter dispatch table 408 includes branch routines for bytecodes that provide debugging checks, such as, for example, single stepping and tracing of bytecodes. For example, entry 410 in debug interpreter dispatch table 408 includes a code snippet 412, which contains pointers to instructions used to analyze the Java program, such as debug stepping. Entry 410 also includes address 414, which provides an address to the routine or instructions normally executed for the bytecode that indexes to entry 410. Address 414 is used after code snippet 412 has been executed. Snippet code 412 can point to other functions, such as code tracing.

Once the debugging functions are no longer needed, original dispatch table 406 is copied back into the location for interpreter dispatch table 400 and the bytecode dispatch table normally used to interpret and execute by codes is restored. In this manner, the dispatch table may be dynamically swapped for a loop that provides servicing functions.

In addition, more than one cached interpreter dispatch table may be employed. Still referring to FIG. 4, an interpreter dispatch table 416 also may be copied into the memory location accessed by the interpreter in the JVM. These multiple interpreters dispatch tables may be used to provide different functions. For example, interpreter dispatch table 408 may provide routines used to single step through bytecodes while interpreter dispatch table 416 may provide other routines used to analyze execution of bytecodes. For example, interpreter dispatch table 416 may provide performance monitoring tools. In particular, tracing of invokes and returns may be provided in the code snippet within an entry in interpreter dispatch table 416. Other functions, such as collecting the frequency of bytecode execution also may be provided in the code snippet for entries in dispatch table 416. Furthermore, interpreter dispatch table 416 may be configured to selectively examine bytecode execution. For example, entries 418–422 may contain code snippets for analyzing bytecode execution while entries 424 and 426 do not contain any code snippets for analysis and provide for normal bytecode execution. Although the depicted example employs two cached interpreter dispatch tables, any number of interpreter dispatch tables may be employed depending upon the implementation.

Figure 5:
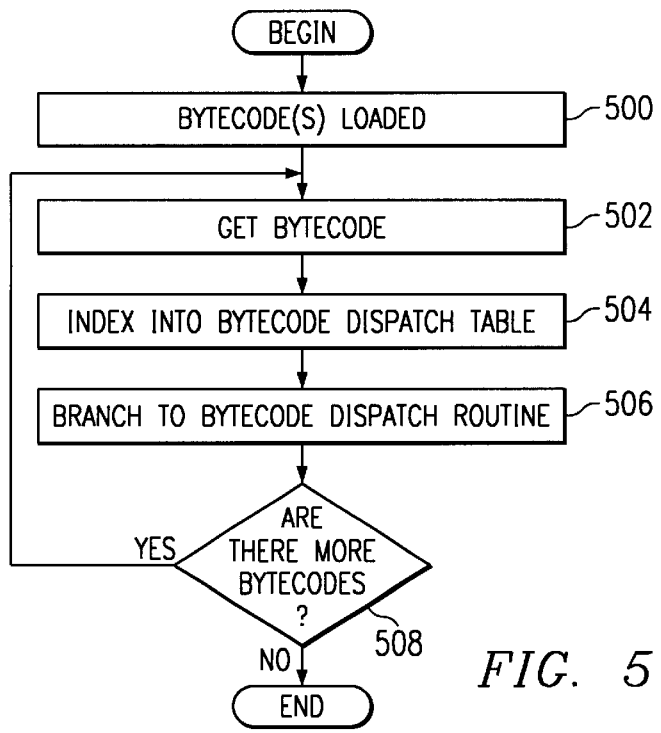
FIG. 5 is a flowchart of a Java interpreter loop process in accordance with a preferred embodiment of the present invention.

Turning now to FIG. 5, a flowchart of a Java interpreter loop process is depicted in accordance with a preferred embodiment of the present invention. The process begins by loading one or more bytecodes for execution (step 500). Thereafter, a bytecode is obtained for processing (step 502). This step obtains bytecodes in the order that they are to be interpreted by the interpreter. The bytecode is an index into the interpreter dispatch table (step 504) and then the process branches to the dispatch routine identified by the table (step 506). The process then determines whether additional bytecodes are present for processing (step 508). If additional bytecodes are present for processing, the process returns to step 502 to obtain the next bytecode for processing. Otherwise, the process terminates.

Figure 6:
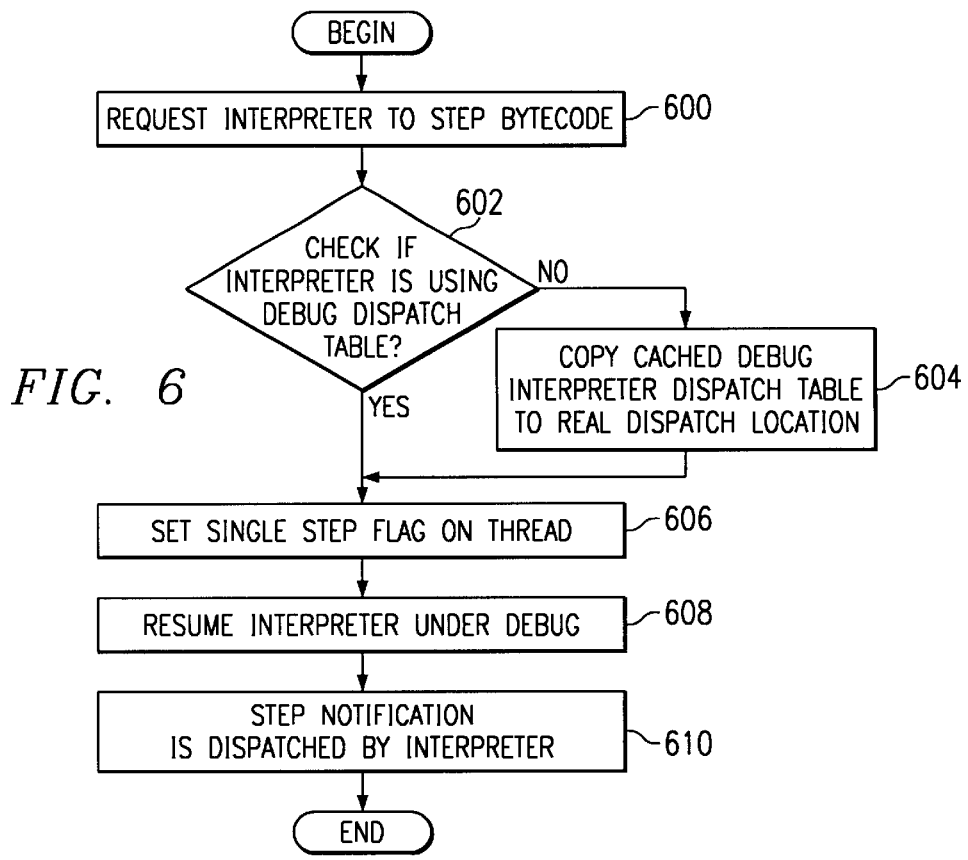
FIG. 6 is a flowchart of a process for enabling the debug interpreter loop for single stepping through bytecodes in accordance with a preferred embodiment of the present invention.

With reference now to FIG. 6, a flowchart of a process for enabling the debug interpreter loop for single stepping through bytecodes is depicted in accordance with a preferred embodiment of the present invention. The process begins in response to an external request to single step through the bytecodes (step 600). In the depicted example, a user may provide the external requests to single step through a Java program. A determination is then made as to whether the interpreter is using the debug dispatch table (step 602). If the interpreter is not using the debug dispatch table, the cached debug interpreter dispatch table is copied to the real dispatch location accessed by the interpreter in indexing bytecodes (step 604). Thereafter, a single step flag is set on the thread (step 606). The setting of the flag on the thread in step 606 is used to identify the thread that is to be single stepped. A user may select one or more threads for debugging. The interpreter then resumes under debug (step 608) and step notification is dispatched by the interpreter (step 610) with the process returning thereafter. In step 610, the step notification is sent to the debug probe. Referring back to step 604, if the interpreter is already using the debug dispatch table, the process proceeds to step 606 directly, as described above.

Figure 7:
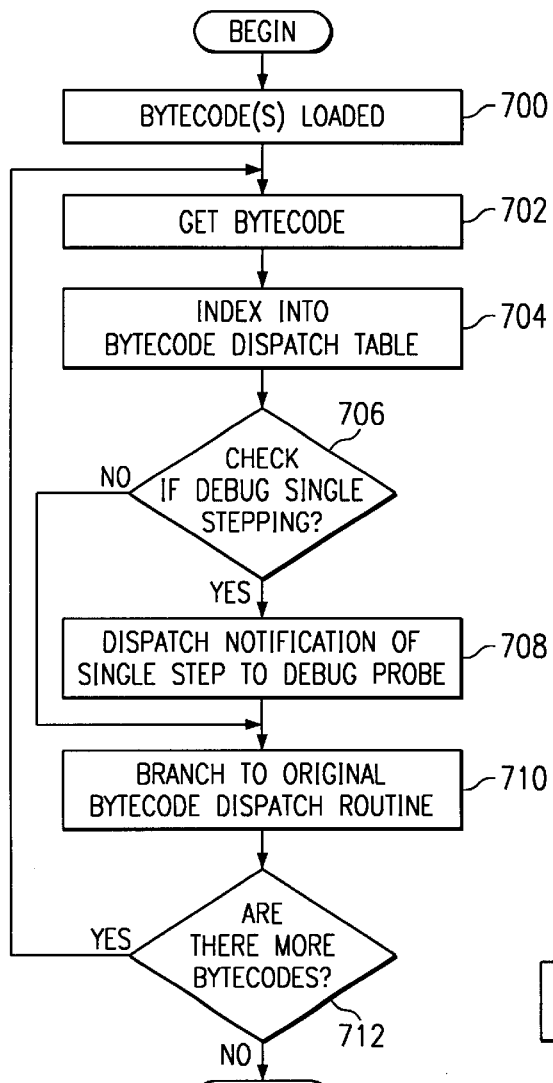
FIG. 7 is a flowchart of Java interpreter loop process used in debugging in accordance with a preferred embodiment of the present invention.

Turning next to FIG. 7, a flowchart of Java interpreter loop process used in debugging is depicted in accordance with a preferred embodiment of the present invention. This process occurs in response to enablement of the debugging functions as illustrated above in FIG. 6. The process begins by loading one or more bytecodes for execution (step 700). Thereafter, a bytecode is obtained for processing (step 702). This step obtains bytecodes in the order that they are to be processed or interpreted by the interpreter. The bytecode is indexed into the interpreter bytecode dispatch table (step 704).

Next, a determination is made as to whether debug single stepping has been activated (step 706). If debug single stepping has been activated, the process then dispatches notification of a single step to the debug probe (step 708). The debug probe is a probe used in debugging the interpretation of bytecodes. After notification, the process branches to the original bytecode dispatch routine identified by indexing the bytecode into the interpreter bytecode dispatch table (step 710). The process then determines whether additional bytecodes are present for processing (step 712). If additional bytecodes are present for processing, the process returns to step 702 to obtain the next bytecode for processing. Otherwise, the process terminates. With reference again to step 706, if debug single stepping is not active, the process proceeds directly to step 710 as described above.

Figure 8:
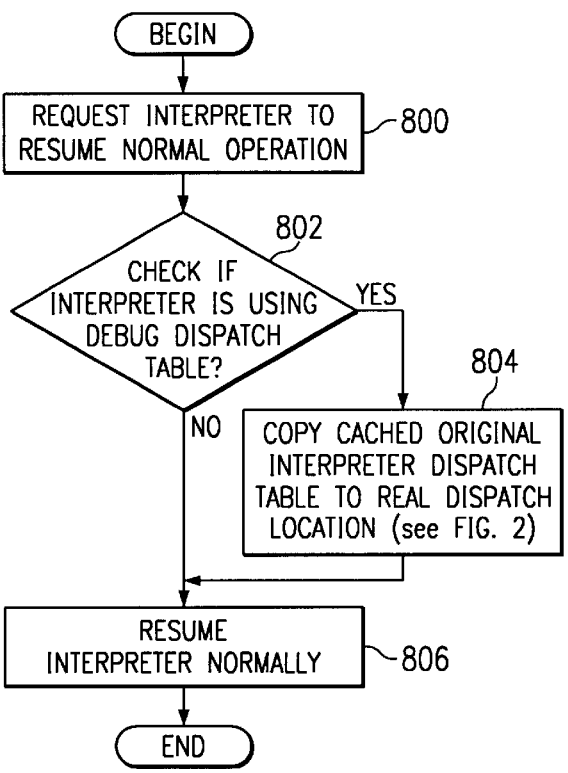
FIG. 8 is a flowchart of a process for restoring the interpreter loop to a non-debug mode in accordance with a preferred embodiment of the present invention.

Next, FIG. 8 is a flowchart of a process for restoring the interpreter loop to a non-debug mode in accordance with a preferred embodiment of the present invention. This process returns the bytecode dispatch table in the assembly loop to normal execution of Java programs without debugging functions. The process begins by in response to receiving an external debugger request to resume normal operation (step 800). The external request may be an input from the user terminating debugging of the Java program. A determination is made to determine whether the interpreter is using the debug dispatch table (step 802). If the interpreter is using the debug dispatch table, the cached original interpreter dispatch table is copied to the location for the interpreter dispatch table used by the interpreter (step 804). Thereafter, the interpreter resumes processing normally (step 806) with the process terminating.

Thus, the present invention provides an improved method, apparatus, and computer readable medium for providing speed in executing Java programs and serviceability by allowing debugging without having to restart or use a different Java OS image. The present invention provides this advantage through a mechanism that switches from a bytecode dispatch table that provides for normal execution to a bytecode dispatch table that provides debugging functions when analysis and debugging of a program is desired. In this manner, execution of Java programs is performed with optimal speed while analysis of a Java program may be performed by switching of the normal dispatch table with one including pointers to routines for performing the analysis.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. For example, although the depicted examples are directed towards interpretation and analysis of Java bytecodes, the processes of the present invention also may be applied to any programming language in which program instructions are interpreted to perform additional analysis for the platform on which the program is executing. The embodiment was chosen and described in order to best explain the principles of the invention with a practical application and to enable others of ordinary skill in the art to understand the invention for various embodiments with various modifications as are suited to the particular use contemplated.

What is claimed is:

1. A method in computer for interpreting bytecodes for a Java program, wherein the bytecodes are interpreted using a first dispatch table having addresses to routines that are executed for bytecodes, the method comprising the computer implemented steps of:
providing a second dispatch table, wherein the second dispatch table includes an address to a routine for analyzing the Java program and addresses to the routines executed for the bytecodes; and
using the second dispatch table to interpret bytecodes in response to a request to analyze the Java program.

2. The method of claim 1, wherein the first dispatch table is located at a table address and wherein the step of using comprising:
saving the first dispatch table; and
copying the second dispatch table to the table address.

3. The method of claim 2 further comprising:
restoring the first dispatch table to the table address in response to a request to end analyzing of the Java program.

4. The method of claim 1, wherein the analyzing of the Java program is debugging of the Java program.

5. The method of claim 1, wherein the routine for analyzing the Java program provides a single stepping function.

6. The method of claim 1, wherein the routine for analyzing the Java program provides a tracing function.

7. The method of claim 1, wherein the routine addressed by the second dispatch table provides a first function for analyzing the Java program, wherein the second dispatch table is used in response to a request for the first function and further comprising:
providing a third dispatch table, wherein the third dispatch table includes an address to a routine for analyzing the Java program using a second function and addresses to the routines executed for the bytecodes; and
using the third dispatch table to interpret the bytecodes in response to a request for the second function.

8. A computer for interpreting bytecodes for a Java program, wherein the bytecodes are interpreted using a first dispatch table having addresses to instructions that are executed for bytecodes, the method comprising the computer implemented steps of:
providing means for providing a second dispatch table, wherein the second dispatch table includes addresses to instructions for analyzing the Java program and addresses to the routines executed for the bytecodes; and
using means for using the second dispatch table to interpret bytecodes in response to a request to analyze the Java program.

9. The computer of claim 8, wherein the first dispatch table is located at a table address and wherein the using means comprises:
saving means for saving the first dispatch table; and
copying means for copying the second dispatch table to the table address.

10. The computer of claim 9 further comprising:
restoring means for restoring the first dispatch table to the table address in response to a request to end analyzing of the Java program.

11. The computer of claim 8, wherein the routine addressed by the second dispatch table provides a first function for analyzing the Java program, wherein the second dispatch table is used in response to a request for the first function and further comprising:
providing means for providing a third dispatch table, wherein the third dispatch table includes an address to a routine for analyzing the Java program using a second function and addresses to the routines executed for the bytecodes; and
using means for using the third dispatch table to interpret the bytecodes in response to a request for the second function.

12. The computer of claim 8, wherein the routine for analyzing the Java program provides a single stepping function.

13. The computer of claim 8, wherein the routine for analyzing the Java program provides a tracing function.

14. A data processing system comprising:
a first dispatch table, wherein the dispatch table is located at a dispatch table address wherein the dispatch table includes addresses to routines executed for bytecodes;
a second dispatch table, wherein the second dispatch table includes addresses to instructions for analyzing a program and addresses to the routines executed for bytecodes;

an interpreter, wherein the interpreter accesses a dispatch table located at the dispatch table address to process bytecodes;

saving means, responsive to a request to analyze a program, for saving the first dispatch table; and copying means, responsive to saving of the dispatch table, for copying the second dispatch table to the dispatch table address.

15. The data processing system of claim 14 further comprising:

restoring means, responsive to a request to end debugging of the program, for copying the first dispatch table to the dispatch table address.

16. The data processing system of claim 14, wherein the first dispatch table is saved by copying the first dispatch table to portion of memory normally unoccupied by the first dispatch table.

17. The data processing system of claim 14, wherein the first dispatch table is saved by copying the first dispatch table to a storage device.

18. A computer program product for interpreting bytecodes for a Java program, wherein the bytecodes are interpreted using a first dispatch table having addresses to instructions that are executed for bytecodes, the computer program product comprising:

computer readable medium;

first instructions for providing a second dispatch table, wherein the second dispatch table includes addresses to instructions for analyzing the Java program and addresses to the routines executed for the bytecodes; and second instructions for using the second dispatch table to interpret bytecodes in response to a request to analyze the Java program, wherein the instructions are embodied within the computer readable medium.

19. The computer program product of claim 18, wherein the first dispatch table is located at a table address and wherein the second instructions means comprises:

instructions for saving the first dispatch table; and instructions for copying the second dispatch table to the table address.

* * * * *